March 12, 1940. C. S. REED ET AL Re. 21,396

DIRECT FIRED OIL HEATER

Original Filed Sept. 8, 1932 4 Sheets-Sheet 1

INVENTORS
Carl S. Reed
Vincent Weaver Smith
By Their Attorney
Guy Atkinson

March 12, 1940. C. S. REED ET AL Re. 21,396

DIRECT FIRED OIL HEATER

Original Filed Sept. 8, 1932 4 Sheets-Sheet 2

INVENTORS
Carl S. Reed
Vincent Weaver Smith
By Their Attorney

March 12, 1940. C. S. REED ET AL Re. 21,396

DIRECT FIRED OIL HEATER

Original Filed Sept. 8, 1932 4 Sheets-Sheet 3

INVENTORS
Carl S. Reed
Vincent Weaver Smith
By Their Attorney
Guy Atkinson.

March 12, 1940. C. S. REED ET AL Re. 21,396

DIRECT FIRED OIL HEATER

Original Filed Sept. 8, 1932 4 Sheets-Sheet 4

INVENTORS
Carl S. Reed
Vincent Weaver Smith
By Their Attorney
Lucy Atkinson

Reissued Mar. 12, 1940

Re. 21,396

UNITED STATES PATENT OFFICE 21,396

DIRECT FIRED OIL HEATER

Carl S. Reed and Vincent W. Smith, New York, N. Y., assignors to The Lummus Company, New York, N. Y., a corporation of Delaware Original No. 2,147,609, dated February 14, 1939, Serial No. 632,154, September 8, 1932. Renewed April 13, 1938. Application for reissue October 7, 1939, Serial No. 298,478

22 Claims. (Cl. 196—110)

Our invention relates to a heater for fluids and is particularly useful for heating oil to be refined or cracked. However, the invention is not restricted to such use.

One object of the invention is the provision of a direct fired fluid heater wherein substantially all of the heat carried to the fluid is transmitted by radiation. Another object is the provision of such a heater wherein the heat of combustion may be transferred substantially by radiation alone to exposed tubes in the heater sides which carry the fluid to be heated. A further object is the construction of a heater wherein the rate of heat absorption at the point of exit from the heater is controlled. Other objects will appear upon consideration of the present specification.

The invention is shown by way of illustration in the accompanying drawings wherein—

Figure 1:
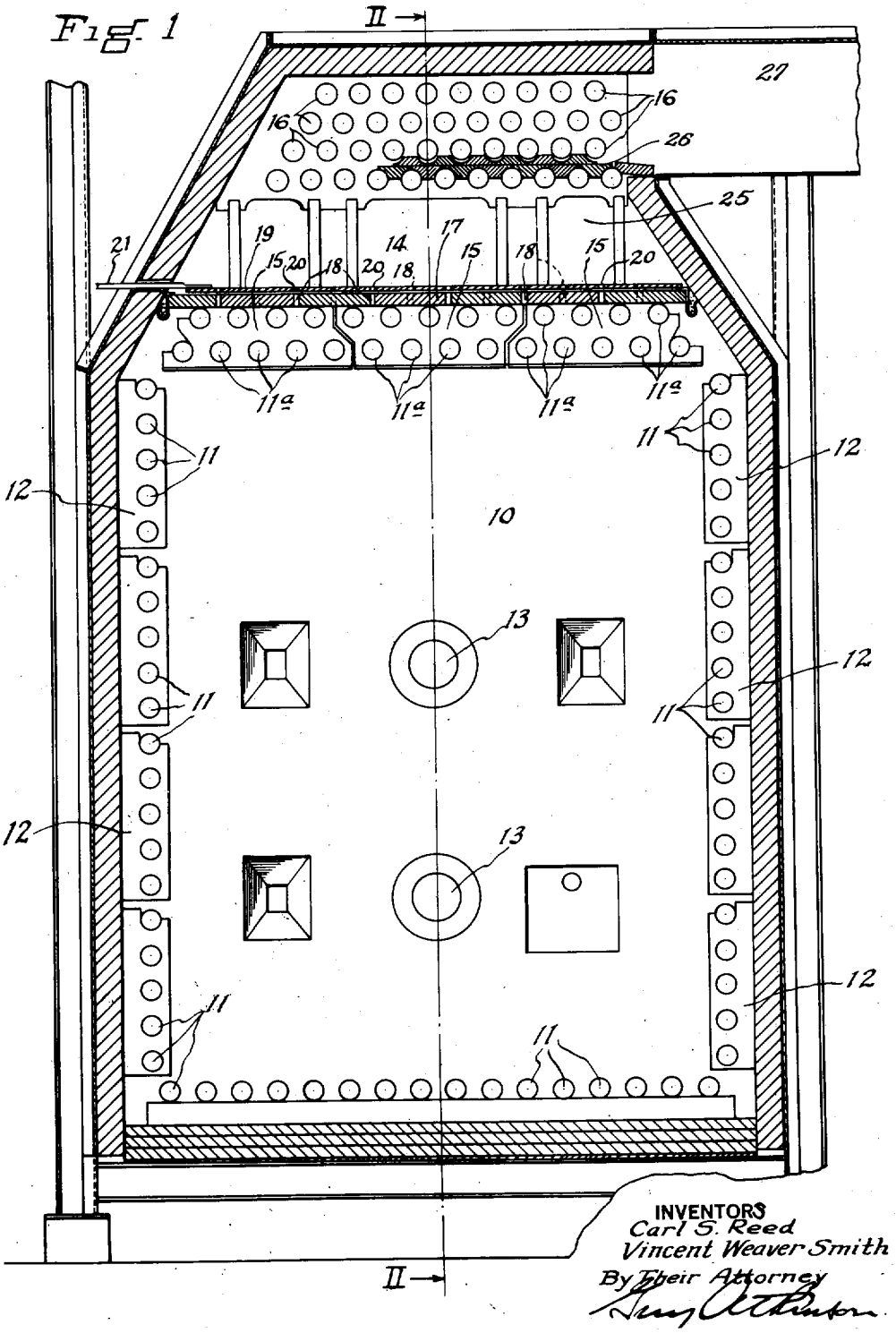
Figure 2:
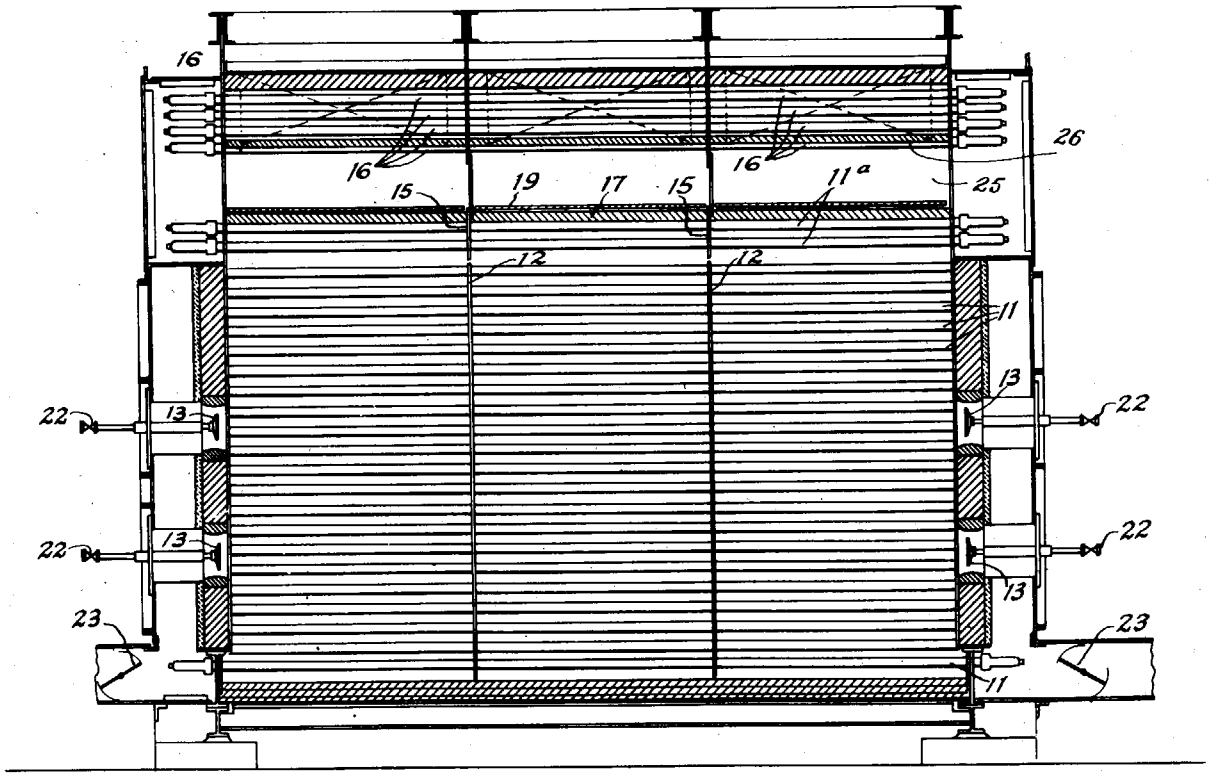
Figure 3:
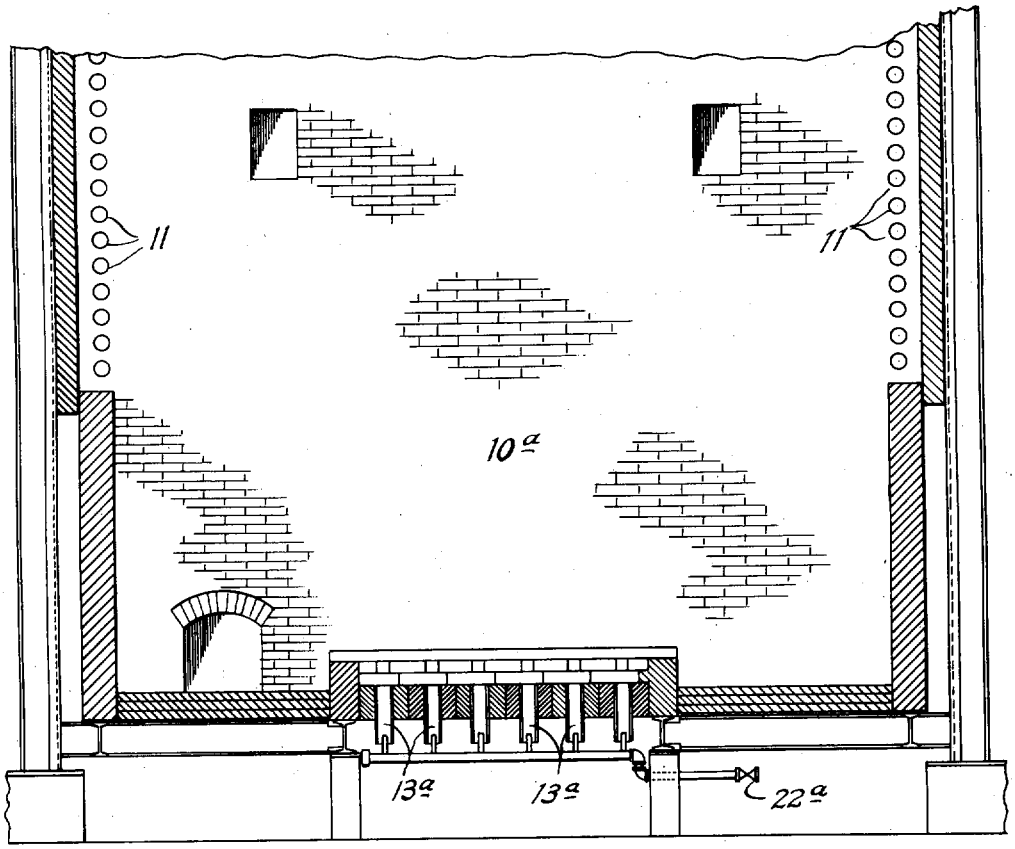
Figure 5:
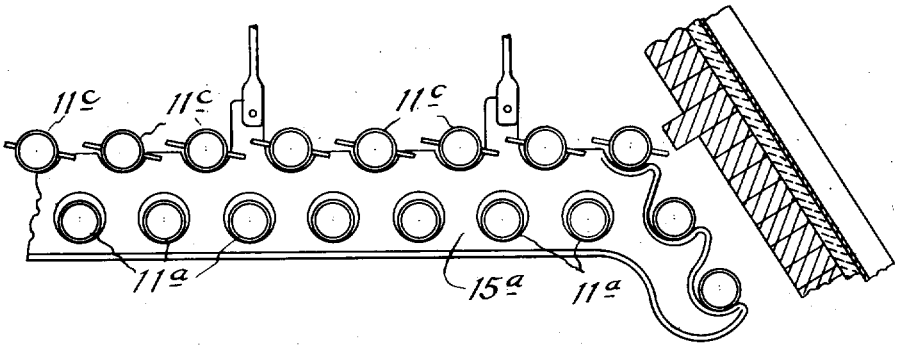
Figure 6:
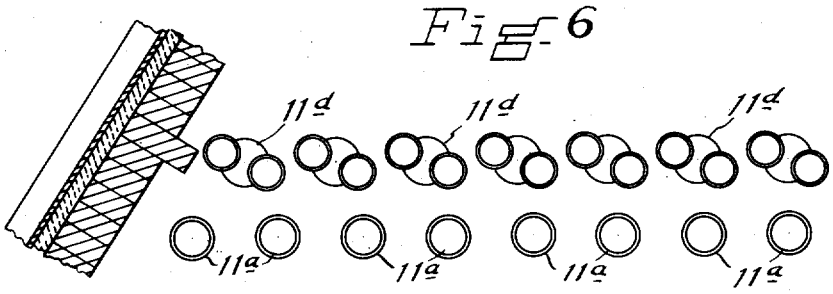
Figure 7:
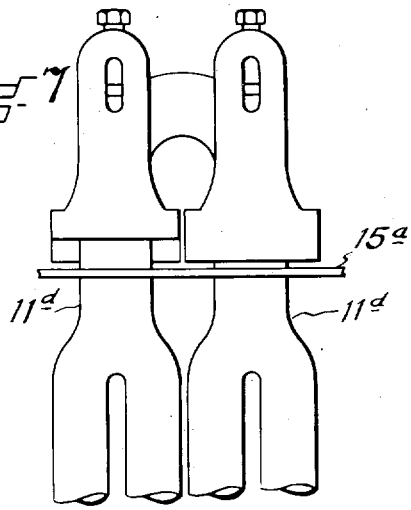
Figure 4:
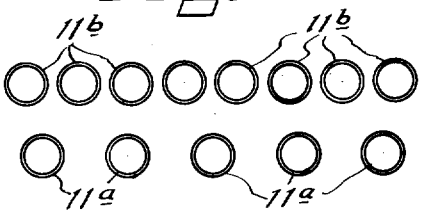

Figure 1 is a vertical cross-section of the heater,

Fig. 2 is a longitudinal vertical section on the line II—II of the heater illustrated in Figure 1, Fig. 3 is a vertical cross-section of the lower part of a modified form of heater, Fig. 4 is a vertical cross-section of part of the heater showing a modified form of roof wherein a row of tubes functions as a diffusion baffle, Fig. 5 is a vertical cross-section of part of the heater showing another modified form of roof, Fig. 6 is a vertical cross-section of part of the heater showing still another modified form of roof, and Fig. 7 is a fragmental view illustrating one of the bifurcated tubes used in the roof illustrated in Fig. 6.

In heating oil it is necessary to regulate the degree of heat which is applied to the tubes containing the oil to be heated. It is further necessary to control the rate at which heat is carried to the tubes. In the past it has been considered good practice to prevent radiant heat from reaching the tubes carrying the oil, and heaters have accordingly been constructed so that the combustion gases are carried to the oil tubes in such a way as to eliminate the effects of radiation, and to heat these tubes substantially by convection alone. When attempts have been made to transfer heat by radiation at comparatively high rates difficulties have been encountered. The oil has been decomposed through local overheating and the desired product has not been obtained. This has been particularly true at the part of the furnace where the combustion gases are discharged. We have now discovered that highly desirable results may be obtained by carrying heat to the oil tubes by radiation alone and by controlling the rate of combustion and the rate of travel of the combustion gases out of the furnace. In the present invention means is provided for preventing excessive heating at or adjacent the point of exit of the combustion gases.

Referring now more particularly to the drawings, there is shown a furnace 10 and exposed tubes 11 in the sides of the furnace. The word "sides" is used to denote the bounding surfaces of the furnace including the floor and the roof. As here shown, the tubes in the walls are held in position by supporting members 12 at intervals along the wall, while the floor tubes merely rest directly on the floor, and the roof tubes are otherwise suspended, as will be later explained.

Burners are provided for projecting fuel and air into the furnace 10. Such burners may be oil or gas burners 13 extending through two opposite walls of the furnace, as illustrated in Fig. 2. The burners illustrated in Fig. 2 project through walls which have no tubes upon them, and throw a jet of fuel toward the middle of the furnace. The result is a greater heating effect near the middle of the furnace and a resulting tendency for the tubes to be cooler adjacent the walls through which the burners project. Instead of cooling these walls with heat absorbing tubes, however, they are left substantially uncooled and the ends of the wall tubes adjacent these substantially uncooled walls thus have their temperature raised by radiation from these walls. Furthermore, such a construction makes it easy to dispose the burners as desired since provision need not be made for displacing wall tubes adjacent the opening for each burner.

On the other hand these burners may project through the floor of the furnace, as shown at 13a in Fig. 3, or through any side.

Thus the tubes 11 on the walls and floor provide means for abstracting heat adjacent the zone of combustion, and abstraction takes place substantially entirely by radiation, as will be more fully explained.

To avoid the possibility of overheating tubes exposed to both direct radiation and convection, one of the sides of the furnace, preferably the roof 14, is open over its entire area, except for tubes 11a extending thereacross, providing a heating gas outlet of substantial flow area. As shown in Fig. 1, the roof tubes 11a are arranged in two staggered rows, the tubes 11a being parallel to and of the same length as the other wall and floor tubes 11 and suspended at intervals by supporting members 15 extending across the furnace. The lower row of roof tubes being relatively widely spaced and contacted by heating gases at a relatively low velocity, will have a very low convection heat transfer thereto.

Above the roof tubes 11[a] is provided a flow equalizing or plenum chamber 25 of substantial volume in which the heating gases collect after passing over the roof tubes and before entering the convection heating section of the heater. The convection heating section is formed by a relatively shallow bank of staggered rows of tubes 16 extending parallel to and of the same length as the tubes 11 and 11[a]. Effective heat transfer conditions for the tubes 16 are maintained by causing a horizontal flow of the heating gases transversely of the tubes, and for this purpose a baffle 26 extends horizontally from one of the side walls partly across the heater on the lowermost row of tubes 16. A heating gas outlet 27 is provided above the wall end of the baffle 26, so that heating gases entering the plenum chamber must first pass around the baffle 26 and horizontally across the bank of tubes 16 before reaching the gas outlet.

To avoid local overheating of the tubes 11[a] due to laning or channelling of the low velocity heating gases relative thereto, a diffusion baffle is arranged at the outer side of the lower row of tubes 11[a] with the gas flow passages therein uniformly distributed and of less aggregate flow area than the aggregate intertube area of the subjacent portions of the lower row of tubes 11[a], thereby providing a pressure drop between opposite sides of the baffle which will cause the low velocity heating gases to flow uniformly past all of the tubes 11[a] in the lower row. Such a baffle 17 is shown in Figure 1 above the double row of roof tubes 11[a], being composed of tile or other suitable material having openings 18 distributed substantially uniformly over the entire area. This baffle performs two functions—it presents a restricted area for the outlet of the hot gases which insures slow travel of the combustion gases through the furnace proper particularly past the roof tubes; it also distributes the openings uniformly over the entire baffle surface, thus providing a uniform flow of heating gases across the roof tubes.

The effective flow area of the openings 18 in the baffle 17 is advantageously adjustable to regulate the pressure drop through the diffusion baffle as desired. Slidable tile 19 are positioned on the baffle 17 with openings 20 therein distributed to register with those in the baffle 17, and being operable by means of externally extending rods 21, whereby the position of the tile 19 may be altered to increase or decrease the effective flow area of the openings 18 in the baffle.

Instead of employing a separate diffusion baffle supported on the upper row of roof tubes, the same effect may be produced by a special construction of these roof tubes. Thus, in Fig. 4 this upper row comprises tubes 11[b] which are spaced on closer centers than the tubes in the lower row. Thus a pressure drop between the lower side and the upper side of the upper row of tubes 11[b] is established. In this construction the upper row of roof tubes 11[b] is subject to a greater convection heating effect than the lower row by reason of the gases passing between them at a higher velocity than they pass between the tubes in the lower row. When two or more rows of tubes are subjected to radiation the inner row of tubes abstracts a larger percentage of the total radiation to the tubes which are exposed than do the rows beyond. Increasing the velocity of gases past the second row tends to increase the heat pick-up of the second row of tubes by adding convection effects to radiation.

In Fig. 5 another form of roof is shown wherein the diffusion baffle is formed by tubes having radial longitudinal fins thereon. The openings between fins on adjacent tubes may be regulated by turning the tubes as illustrated in Fig. 5; and when the furnace is constructed the tubes 11[c] are turned as shown and fixed to give the desired openings.

Instead of using fin tubes in the outer row of tubes forming the side of the heater through which the combustion gases escape, we may employ bifurcated tubes 11[d], and such an arrangement is illustrated in Figs. 6 and 7. Here again the tubes are turned upon their central axes and fixed in order to give the desired area of opening. A diffusion baffle is thus defined having distributed gas flow passages therein of less aggregate flow area than the aggregate intertube area of the inner row of tubes 11[a].

Means is also provided for controlling the rate of combustion in the furnace in order to control the degree of oil heating in the tubes. Such means is here illustrated by valves 22 and dampers 23 respectively, which regulate the rate at which fuel and air enter the furnace.

In operation the fuel valves 22 are opened, the fuel is ignited and the air supply member opened so that each burner projects a flame into the furnace either through vertical side walls as shown in Fig. 2, or through the floor as shown in Fig. 3. The openings 18 in the diffusion baffle are adjusted to regulate the rate of passage of the combustion gases through the furnace, and oil is circulated through the tubes 11 and 11[a] in the furnace sides. The rate of combustion and the rate of travel of the gases are then adjusted to give the desired degree of heating. Where the upper row of tubes acts as the diffusion baffle, the openings are a part of the furnace design and are fixed when the furnace is built.

In the construction which has been described the transfer of heat takes place substantially entirely by radiation. The travel of the combustion gases takes place at such a rate that very little convection effect results. The tubes in the roof of the furnace (or in the exit side, where the gases do not leave the furnace at the roof) are spaced at sufficient intervals to prevent a rapid flow of gases past the lower row of tubes. The restricted exit areas in the diffusion baffle above the roof tubes are such as to prevent rapid passage of gases past these tubes, and also such as to insure a uniform distribution of the gases across the roof tubes. The result is a heat transfer wherein convection plays a very slight part except in the second row of roof tubes as explained above. While the fluid to be heated preferably enters at the cooler end of the convection bank 16 and passes successively through the tubes 16, roof tubes, side wall tubes and floor tubes in the order named, other connections may be made between the various tube groups.

It will be obvious that this form of heater lends itself easily to a two-stream flow of liquid through the heater, the heating in the two streams being at a substantially uniform rate and to the same final temperature throughout. Thus one stream may flow serially through half the tubes 16, half of the roof tubes, and one group of wall tubes and half of the floor tubes, while the other stream flows through the remaining half of the heating surface.

While specific reference has been made herein to the heating of oil, it is to be understood that the furnace herein described and claimed is capable of use in other connections. Water or some other fluid may be passed through the tubes in the furnace walls, and the degree of heating may be appropriately regulated with great ease.

The invention is not limited to the precise construction or application herein defined. Other forms and uses of the invention which do not depart from the proper scope of the appended claims will readily suggest themselves to those dealing with problems of heat transfer.

With this understanding, we claim:

1. In a fuel-fired heater, radiant heat absorbing tubes forming one side thereof, a gas exit from the heater beyond the tubes and other tubes having longitudinal fins thereon forming a diffusion baffle beyond said tubes which form the furnace side, adjacent baffle tubes having narrow spaces between the fins thereon whereby the rate of gas flow past the radiantly heated tubes is controlled.

2. A fluid heater comprising a furnace chamber having a heating gas exit occupying a major portion of the area of one of the boundary walls thereof, a row of bare fluid heating tubes extending across said gas exit in transversely spaced relation and in position to receive radiant heat directly from said furnace chamber, and means forming a diffusion baffle having distributed gas flow passages therein at the outer side of said row of tubes, and means for varying the effective flow area through said diffusion baffle passages.

3. An oil heater comprising a box-shaped furnace chamber having a row of horizontally extending oil heating tubes extending across a heating gas exit in one side of and in position to receive radiant heat from said furnace chamber, and a row of bifurcated tubes at the outer side of said first row of tubes and arranged to form a diffusion baffle having distributed gas flow passages therein of less aggregate flow area than the aggregate intertube area of said first row of tubes.

4. An oil heater comprising walls forming a furnace chamber of substantially rectangular horizontal and vertical cross-section, groups of serially connected horizontal tubes along opposite side walls of said furnace chamber, a plurality of staggered rows of horizontal tubes across the roof of said furnace chamber, fuel burners mounted in the end walls of said furnace chamber and arranged to discharge streams of fuel towards the center of said furnace chamber, a gas exit flue opening through the roof of said furnace chamber, a bank of convection heated tubes positioned in said flue, and diffusion baffle means extending across said roof immediately superjacent said roof tubes for maintaining a uniform distribution of heating gases at a low velocity across the lowermost row of tubes positioned across said roof opening.

5. An oil heater comprising a box-shaped furnace chamber having a row of horizontally extending oil heating tubes extending across a heating gas exit in one side of and in position to receive radiant heat from said furnace chamber, and a second row of tubes having fins extending along opposite sides thereof and arranged to form a diffusion baffle having distributed gas flow passages therein of less aggregate flow area than the aggregate intertube area of said first row of tubes.

6. An oil heater comprising a box-shaped furnace chamber having horizontally extending oil heating tubes extending across the roof thereof and in position to receive radiant heat from said furnace chamber, a heating gas exit in said roof and across which said roof tubes extend, means forming a diffusion baffle at the upper side of said roof tubes having gas flow passages therein of less aggregate flow area than the spaces between the subjacent roof tubes, means forming a plenum chamber above said diffusion baffle, a convection heated bank of fluid heating tubes above said plenum chamber, and a horizontal baffle separating said tube bank and plenum chamber and arranged to cause the heating gases to enter said tube bank at one side thereof and flow horizontally thereacross, and a heating gas exit at the opposite side of said tube bank.

7. An oil heater comprising a box-shaped furnace chamber having horizontally extending oil heating tubes extending along opposite vertical side walls and the roof thereof, a heating gas exit occupying a major portion of the roof area and across which said roof tubes extend, means forming a plenum chamber above said roof tubes, a convection heated bank of fluid heating tubes above said plenum chamber, a horizontal baffle separating said tube bank and plenum chamber and arranged to cause the heating gases to enter said tube bank at one side thereof and flow horizonally thereacross, and a heating gas exit at the opposite side of said tube bank.

8. A tubular oil heater comprising a furnace chamber having radiant heat absorbing transversely spaced oil heating tubes extending along the sides thereof, one of the furnace chamber sides having a heating gas exit occupying a major portion of the area thereof and a plurality of staggered rows of relatively widely spaced oil heating tubes extending across said gas exit and arranged to receive radiant heat from said furnace chamber, means for burning fluid fuel in suspension in said furnace chamber, and means supported on the second of said staggered rows of tubes and partly closing substantially all of the spaces therebetween to form a diffusion baffle having uniformly distributed gas flow passages of less aggregate flow area than the aggregate intertube area of the first of said staggered rows of tubes.

9. A tubular oil heater comprising a box-shaped furnace chamber having a heating gas exit occupying a major portion of the roof area thereof and a plurality of staggered rows of relatively widely spaced oil heating tubes extending across said gas exit and arranged to receive radiant heat from said furnace chamber, means for burning fluid fuel in suspension in said furnace chamber, and means supported on the second of said staggered rows of tubes and partly closing substantially all of the spaces therebetween to form a diffusion baffle having uniformly distributed gas flow passages of less aggregate flow area than the aggregate intertube area of the first of said staggered rows of tubes.

10. An oil heater comprising a furnace chamber having a heating gas exit occupying a major portion of the area of one of the boundary sides thereof, means for burning fuel in said furnace chamber, inner and outer rows of transversely spaced oil heating tubes extending across said gas exit with the tubes in said inner row in position to receive radiant heat for a major portion of their length from said furnace chamber, and means associated with said outer row of tubes forming a diffusion baffle across said gas exit having a series of gas flow passages therein registering with substantially all of the intertube spaces of said outer tube row and of substantially less aggregate flow area than the aggregate intertube area of said inner row of tubes to provide a low velocity heating gas flow across the portions of the tubes in said inner row extending across said gas exit.

11. An oil heater comprising a furnace chamber having a heating gas exit occupying a major portion of the area of the roof thereof, means for burning fuel in said furnace chamber, upper and lower rows of horizontally arranged transversely spaced oil heating tubes extending across said gas exit with the tubes in said lower row in position to receive radiant heat for a major portion of their length from said furnace chamber, and means associated with said upper row of tubes forming a diffusion baffle across said gas exit having a series of gas flow passages therein registering with substantially all of the intertube spaces of said upper tube row and of substantially less aggregate flow area than the aggregate intertube area of said lower row of tubes to provide a substantially uniform low velocity heating gas flow across the portions of the tubes in said lower row extending across said gas exit.

12. An oil heater comprising a furnace chamber having a heating gas exits occupying a major portion of the area of the roof thereof, means for burning fuel in said furnace chamber, upper and lower rows of horizontally arranged transversely spaced oil heating tubes extending across said gas exit with the tubes in said lower row in position to receive radiant heat for a major portion of their length from said furnace chamber, and baffle tile supported on said upper row of tubes and constructed to form a diffusion baffle across said gas exit having a series of gas flow passages therein registering with substantially all of the intertube spaces of said upper tube row and of substantially less aggregate flow area than the aggregate intertube area of said lower row of tubes to provide a substantially uniform low velocity heating gas flow across the portions of the tubes in said lower row extending across said gas exit.

13. In a furnace for heating oil, walls, a roof, bare oil heating tubes in said walls and said roof exposed to radiant heat directly from said furnace, said roof being open across substantially the entire furnace except for the tubes therein and providing for the exit of combustion gases, and diffusion baffle means extending across said roof immediately superjacent said roof tubes and providing a uniform velocity of the combustion gases passing through the roof over said roof tubes.

14. An oil heater comprising a furnace chamber having a heating gas exit comprising a major portion of the area of one of the boundary walls thereof, means for burning fuel in said furnace chamber, a row of serially connected bare oil heating tubes extending across said gas exit in transversely spaced relation and in position to receive radiant heat over a major portion of their length directly from said furnace chamber, and means closely adjacent to the outer side of said tube row forming a diffusion baffle across said gas exit having a multiplicity of gas flow passages therein of substantially less aggregate flow area than the aggregate intertube area of the portions of the tubes in said row extending across said gas exit and proportioned and arranged to provide a substantially uniform heating gas flow across said tube portions.

15. An oil heater comprising a furnace chamber having a heating gas exit in the roof thereof, means for burning fuel in said furnace chamber, upper and lower rows of transversely spaced oil heating tubes extending across said gas exit with the tubes in said lower row bare and in position to receive radiant heat directly from said furnace chamber, and means associated with said upper row of tubes forming a diffusion baffle across said gas exit having a series of gas flow passages therein of substantially less aggregate flow area than the aggregate intertube area of the portions of the tubes in said lower row extending across said gas exit and arranged and proportioned to provide a substantially uniform heating gas flow across said lower row tube portions.

16. An oil heater comprising a furnace chamber having a heating gas exit comprising substantially the entire area of the roof thereof, means for burning fuel in said furnace chamber, groups of serially connected bare oil heating tubes extending along opposite side walls of said furnace chamber symmetrically arranged relative to said fuel burning means and in position to receive radiant heat over substantially their entire length directly from said furnace chamber, means forming a diffusion baffle across said gas exit having a series of small gas flow passages substantially uniformly distributed therein and of substantially less aggregate flow area than said roof area to provide a substantially uniform low velocity heating gas flow through said gas exit, and means forming a plenum chamber at the upper side of said diffusion baffle.

17. An oil heater comprising a furnace chamber having a heating gas exit occupying a major portion of the area of one of the boundary walls thereof, means for burning fuel in said furnace chamber, a row of transversely spaced bare oil heating tubes extending across said gas exit with the tubes in position to receive radiant heat for a substantial portion of their length directly from said furnace chamber, means closely adjacent to the outer side of said row forming a diffusion baffle across said gas exit having a series of gas flow passages therein communicating with the intertube spaces of said tube row and of substantially less aggregate flow area than the aggregate intertube area of the portions of the tubes in said row extending across said gas exit and arranged and proportioned to provide a substantially uniform heating gas flow across said tube portions, and means forming a plenum chamber at the outer side of said diffusion baffle.

18. An oil heater comprising a box-shaped furnace chamber having a heating gas exit occupying substantially the entire area of the roof thereof, means for burning fuel in suspension in said furnace chamber, groups of serially connected horizontally extending oil heating tubes arranged along opposite side walls of said furnace chamber, upper and lower rows of transversely spaced oil heating tubes extending across said gas exit with the tubes in said lower row in position to receive radiant heat throughout their length from said furnace chamber, baffle means associated with said upper row of tubes forming a diffusion baffle across said gas exit having a series of gas flow passages therein communicating with the intertube spaces of said upper tube row and of substantially less aggregate flow area than the aggregate intertube area of said lower row of tubes, means forming a plenum chamber superjacent to said diffusion baffle, and a bank of fluid heating tubes arranged to receive heating gases from said plenum chamber.

19. An oil heater comprising walls defining a furnace of substantially rectangular horizontal and vertical cross-section, fuel burner means in a wall of said furnace arranged to project a fluid fuel into said furnace, a group of serially connected horizontally arranged bare oil heating tubes extending along one wall of the furnace, a separate group of similar tubes extending along the opposite wall of the furnace with said tube groups symmetrically arranged relative to said fuel burner means and in position to receive radiant heat over substantially their entire length directly from said furnace, ceramic refractory means having a multiplicity of spaced, relatively small gas exit openings therein constituting a diffusion baffle forming one of the remaining walls of said furnace with said gas exit openings proportioned and distributed therein to provide a substantially uniform discharge of heating gases across the entire heating gas exit area, means forming a plenum chamber at the outer side of said diffusion baffle, a bank of oil heating tubes above said plenum chamber and arranged to be heated by convection by heating gases from said plenum chamber, and said fuel burner means, oil heating tube groups, and diffusion baffle being relatively arranged to provide a gas flow from said heating gas exit openings upwardly through said plenum chamber to said convection bank of tubes.

20. An oil heater comprising walls defining a furnace of substantially rectangular horizontal and vertical cross-section, fuel burner means mounted in a vertical wall of said furnace and arranged to project a fluid fuel horizontally into said furnace, a group of serially connected horizontally arranged bare oil heating tubes extending along one wall of the furnace, a separate group of similar tubes extending along the opposite wall of the furnace with said tube groups symmetrically arranged relative to said fuel burner means and in position to receive radiant heat over substantially their entire length directly from said furnace, ceramic refractory means having a multiplicity of spaced, relatively small gas exit openings therein constituting a radiantly heated diffusion baffle forming one of the remaining walls of said furnace with said gas exit openings proportioned and distributed therein to provide a substantially uniform discharge of heating gases across the entire heating gas exit area, means forming a plenum chamber at the outer side of said diffusion baffle, a heating gas flue opening to the upper side of said plenum chamber, a bank of oil heating tubes in said heating gas flue arranged to be heated by convection by heating gases from said plenum chamber, and said fuel burner means, oil heating tube groups, and diffusion baffle being relatively arranged to provide a gas flow from said heating gas exit opening upwardly through said plenum chamber to said convection bank of tubes.

21. An oil heater comprising walls defining a furnace of substantially rectangular horizontal and vertical cross-section having a floor, fuel burner means in opposite vertical walls of said furnace arranged to project streams of fluid fuel horizontally into said furnace, a group of serially connected horizontally arranged bare oil heating tubes extending along one wall of the furnace, a separate group of similar tubes extending along the opposite wall of said furnace with said tube groups symmetrically arranged relative to said fuel burner means and in position to receive radiant heat over substantially their entire length, means forming a gas exit flue receiving heating gases from all of said oppositely arranged fuel burner means, a bank of oil heating tubes in said gas exit flue, means forming a plenum chamber between said gas exit flue and said furnace, ceramic refractory means having a multiplicity of spaced relatively small gas exit openings therein and forming a diffusion baffle forming one of the remaining walls of said furnace and separating said plenum chamber from said furnace and providing a substantially uniform flow of heating gases in said furnace relative to said first named groups of oil heating tubes, and said fuel burner means, oil heating tube groups and diffusion baffle being relatively arranged to provide a heating gas flow through said furnace, diffusion baffle and plenum chamber above the floor level of said furnace and avoid any downflow of heating gases through said furnace and plenum chamber.

22. An oil heater comprising walls defining a furnace of substantially rectangular horizontal and vertical cross-section having a floor and roof, fuel burner means mounted in a wall of said furnace below the roof thereof and arranged to project a fluid fuel into said furnace, said walls defining a heating gas exit forming substantially the entire area of one of the remaining sides of said furnace above the floor thereof, ceramic refractory means having a multiplicity of spaced relatively small gas exit openings therein constituting a diffusion baffle across the entire heating gas exit area with said gas exit openings proportioned and distributed therein to provide a substantially uniform discharge of heating gases through all of said gas exit openings, a group of serially connected, horizontally arranged bare oil heating tubes extending along one of the remaining vertical walls of the furnace, a second group of serially connected, horizontally arranged bare oil heating tubes extending along the vertical wall of the furnace opposite to said last named wall with said tube groups symmetrically arranged relative to said diffusion baffle and fuel burner means and in position to receive radiant heat over substantially their entire length directly from said furnace, means forming a plenum chamber at the outer side of said diffusion baffle, a heating gas flue opening to said plenum chamber, a bank of oil heating tubes in said heating gas flue arranged to be heated by convection by heating gases from said plenum chamber, and said fuel burner means, oil heating tube groups and diffusion baffle being relatively arranged to provide a heating gas flow through said furnace, diffusion baffle, and plenum chamber above the floor level of said furnace and avoid any downflow of heating gases through said furnace and plenum chamber.

CARL S. REED.
VINCENT W. SMITH.